(12) United States Patent
Miller et al.

(10) Patent No.: US 7,028,972 B2
(45) Date of Patent: Apr. 18, 2006

(54) GASKET AND MANDREL ASSEMBLY FOR PIPE JOINTS

(75) Inventors: Michael R. Miller, Churubusco, IN (US); James W. Skinner, Fort Wayne, IN (US)

(73) Assignee: Press-Seal Gasket Corporation, Fort Wayne, IN (US)

( * ) Notice: Subject to any disclaimer, the term of this patent is extended or adjusted under 35 U.S.C. 154(b) by 0 days.

(21) Appl. No.: 10/887,427

(22) Filed: Jul. 8, 2004

(65) Prior Publication Data

US 2006/0006562 A1    Jan. 12, 2006

(51) Int. Cl.
*B28B 7/28* (2006.01)

(52) U.S. Cl. .............................. 249/63; 249/39; 249/95; 249/184; 277/604; 277/606; 277/626; 285/230

(58) Field of Classification Search .................. 249/11, 249/39, 63, 95, 184; 277/602, 604, 606, 277/617, 626; 285/23, 230
See application file for complete search history.

(56) References Cited

U.S. PATENT DOCUMENTS

| 3,727,876 | A | * | 4/1973 | Keyser ........................ 249/184 |
| 3,758,066 | A |   | 9/1973 | Skinner et al. ................ 249/95 |
| 3,796,406 | A |   | 3/1974 | Ditcher ........................ 249/11 |
| 3,813,107 | A |   | 5/1974 | Ditcher ........................ 277/186 |

(Continued)

OTHER PUBLICATIONS

Press-Seal Gasket Corporation, Product Information for Cast-A-Seal.

(Continued)

*Primary Examiner*—Donald Heckenberg
(74) *Attorney, Agent, or Firm*—Baker & Daniels (57) ABSTRACT

A gasket and mandrel assembly, including a gasket having an annular main body portion with an anchor flange and a pipe sealing portion. The gasket is foldable between a folded position in which the pipe sealing portion is disposed substantially within the main body portion and an unfolded position in which the pipe sealing portion extends outwardly of the main body portion along its longitudinal axis. A pair of mandrels are respectively fitted on opposite sides of the folded gasket to enclose most of the gasket for casting the gasket within a wall in a concrete structure. At least one of the mandrels includes an annular outer surface aligned parallel or substantially parallel with the longitudinal axis of the gasket. Removal of the mandrels results in the cast opening in the concrete structure having a circular inner surface which is disposed parallel or substantially parallel to the longitudinal axis of the gasket and the resulting opening such that, if the gasket should fail, the gasket may be removed from the opening and an expansion-type gasket may be sealingly compressed against the opening surface with an expansion band assembly.

20 Claims, 5 Drawing Sheets

U.S. PATENT DOCUMENTS

| | | | |
|---|---|---|---|
| 3,874,063 A | 4/1975 | Skinner et al. | 29/450 |
| 3,973,783 A | 8/1976 | Skinner et al. | 277/190 |
| 4,159,829 A | 7/1979 | Ditcher | 277/189 |
| 4,625,976 A | 12/1986 | Gilbert | 277/12 |
| 4,650,149 A | 3/1987 | Poulette et al. | 249/11 |
| 4,854,543 A | 8/1989 | Daigle et al. | 249/95 |
| 5,171,507 A | 12/1992 | Del Zotto | 264/219 |
| 5,529,312 A | 6/1996 | Skinner et al. | 277/9.5 |
| 5,876,039 A | 3/1999 | Skinner et al. | 277/617 |
| 5,941,535 A | 8/1999 | Richard | 277/606 |
| 6,347,781 B1 * | 2/2002 | Trangsrud | 249/11 |
| 6,371,436 B1 | 4/2002 | Westhoff et al. | 249/63 |
| 6,406,025 B1 | 6/2002 | Westhoff et al. | 277/314 |
| 6,450,505 B1 | 9/2002 | Gavin | 277/606 |
| 6,460,860 B1 | 10/2002 | Gavin | 277/604 |
| 6,568,691 B1 | 5/2003 | Westhoff et al. | 277/604 |
| 6,651,949 B1 | 11/2003 | Westhoff et al. | 249/63 |
| 6,691,975 B1 | 2/2004 | Gavin | 249/39 |
| 2003/0218304 A1 | 11/2003 | Westhoff et al. | 277/604 |

OTHER PUBLICATIONS

Press-Seal Gasket Corporation, Product Information for Cast-A-Seal 603.

\* cited by examiner

FIG_1
PRIOR ART

FIG_2
PRIOR ART

FIG_3

FIG_4

FIG_5

GASKET AND MANDREL ASSEMBLY FOR PIPE JOINTS

BACKGROUND OF THE INVENTION

1. Field of the Invention

The present invention relates to a gasket and mandrel assembly, including a flexible gasket and a pair of mandrels, for use in casting the gasket in place within the wall of a concrete structure, wherein the gasket provides a sealed joint between the concrete structure and a pipe.

2. Description of the Related Art

In general, pipe joint gaskets or seals are well known in the art for sealing a pipe joint connection between a pipe and a structure to which the pipe is connected. In one particular application, for example, a pipe joint is formed between a sewer pipe and a concrete manhole riser, in which a sewer pipe is inserted through a gasket which is embedded within the concrete wall of the manhole riser. In other applications, pipe joints may be provided to connect pipes to septic tanks, for example, or may be provided in any other structures to which pipes are connected.

Figure 1:
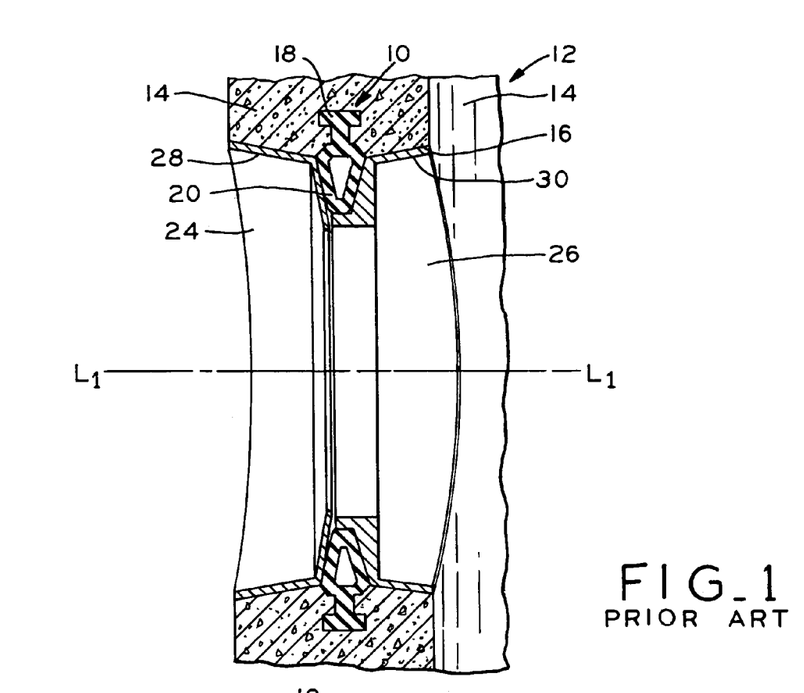
FIG. 1 is a vertical sectional view of a known gasket and mandrel assembly, showing the use of a pair of mandrels to cast the gasket within a wall of a concrete structure.
Figure 2:
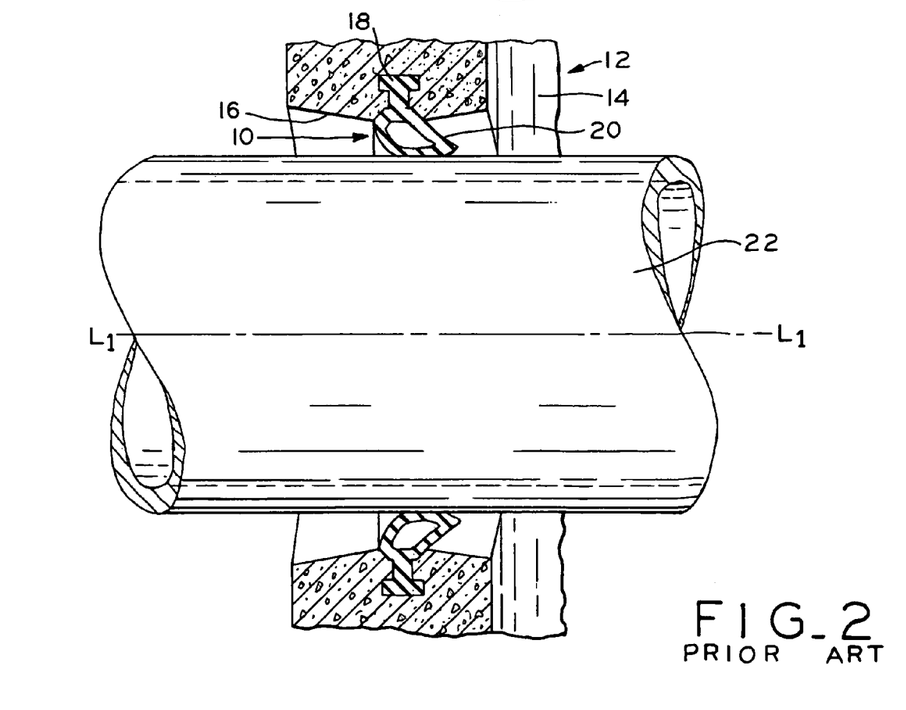
FIG. 2 is a vertical sectional view of the gasket of FIG. 1 cast within the concrete structure, with the mandrels removed and a pipe installed through the gasket.

One known type of pipe joint connection between a concrete structure and a pipe is shown in FIGS. 1 and 2. Referring to FIG. 1, an annular cast-in gasket 10 is shown, which is cast within the wall of a concrete structure 12. Concrete structure 12 typically includes a curved wall 14 having an opening 16 which is formed within wall 14 when gasket 10 is cast in place within wall 14. Gasket 10 generally includes an anchoring portion 18 extending radially outwardly thereof for embedment within the concrete of structure 12, and a compressible sealing portion 20 extending radially inwardly thereof to sealingly engage the outer surface of a pipe 22 inserted through gasket 10, as shown in FIG. 2, to provide a fluid tight seal between pipe 22 and wall 14 of concrete structure 12.

Gasket 10 is cast within concrete structure 12 using a pair of mandrels, including conically-shaped front and rear mandrels 24 and 26, respectively. Front and rear mandrels 24 and 26 are each generally annular in shape, and include outer walls 28 and 30, respectively, which are disposed at an angle which is inclined at least 10° with respect to the common longitudinal axis $L_1$—$L_1$ of gasket 10 and the resulting opening 16 which is formed in concrete structure 12. In particular, it is desirable that outer walls 28 and 30 of mandrels 24 and 26 are inclined at an angle of at least 10° with respect to the longitudinal axis $L_1$—$L_1$ in order to facilitate the easy removal of mandrels 24 and 26 in opposite directions along longitudinal axis $L_1$—$L_1$ from opening 16 in the concrete structure 12 after the cast concrete has cured.

After mandrels 24 and 26 are removed, gasket 10 is anchored in place by the embedment of anchor portion 18 of gasket 10 within the cured concrete of structure 12. It is also desirable for the inner surfaces of opening 16, which are formed by outer walls 28 and 30 of mandrels 24 and 26, to be angled at least 10° with respect to the longitudinal axis $L_1$—$L_1$ in order to accommodate tilting movement of pipe 22 in which pipe 22 becomes misaligned with longitudinal axis $L_1$—$L_1$. Other similar gaskets which are cast in place in a similar manner to the foregoing gasket 10, using similar mandrels, may include a pipe sealing portion which extends along the longitudinal axis $L_1$—$L_1$ of the gasket, with the pipe sealing portion externally clamped to the outer surface of a pipe using a clamping band to provide a fluid tight seal between the gasket and the pipe.

Although the foregoing types of gaskets and mandrels have been effective for forming concrete structures with cast-in gaskets for providing sealed joints between the concrete structures and pipes, a problem with the gaskets and mandrels is that it is possible to cast the gaskets incorrectly within the concrete structures when the structures are initially formed, such as, for example, positioning the gasket incorrectly during casting of the structure. Failure of the gasket in the field after a pipe is connected to the gasket is also possible. In each of these circumstances, repairing or replacing the gasket is often difficult, if not impossible, without re-casting a portion of the concrete structure or replacing the entire concrete structure.

What is needed is a gasket and mandrel assembly for pipe joints which is an improvement over the foregoing.

SUMMARY OF THE INVENTION

The present invention provides a gasket and mandrel assembly, including a gasket having an annular main body portion with an anchor flange and a pipe sealing portion. The gasket is foldable between a folded position in which the pipe sealing portion is disposed substantially within the main body portion and an unfolded position in which the pipe sealing portion extends outwardly of the main body portion along its longitudinal axis. A pair of mandrels are respectively fitted on opposite sides of the folded gasket to enclose most of the gasket for casting the gasket within a wall in a concrete structure. At least one of the mandrels includes an annular outer surface aligned parallel or substantially parallel with the longitudinal axis of the gasket. Removal of the mandrels results in the cast opening in the concrete structure having a circular inner surface which is disposed parallel or substantially parallel to the longitudinal axis of the gasket and the resulting opening such that, if the gasket should fail, the gasket may be removed from the opening and an expansion-type gasket may be sealingly compressed against the opening surface with an expansion band assembly.

Advantageously, should the first cast-in gasket fail, the gasket may be removed and a second, expansion-type gasket may be installed within the opening of the concrete structure without requiring repair or replacement of the concrete structure itself.

In one form thereof, the present invention provides a gasket and mandrel assembly, including a gasket, including an annular main body portion having a longitudinal axis; an anchor flange extending radially outwardly from the main body portion; a pipe sealing portion extending from the main body portion, the pipe sealing portion positioned in a folded condition in which the pipe sealing portion is disposed at least partially within the main body portion; and a pair of mandrels respectively fitted to opposite sides of the gasket, each mandrel including an annular body having an annular cavity, and at least one of the mandrels further having an annular outer surface disposed at an angle of between 0° and 7° with respect to the longitudinal axis of the gasket, the cavities of the mandrels cooperating with one another to substantially enclose at least a portion of the gasket with the anchor flange exposed externally of the mandrels.

In another form thereof, the present invention provides a mandrel assembly for use in casting a gasket within a curved wall of a structure, including a first annular mandrel having a longitudinal axis, an outer wall, an inner wall spaced radially inwardly from the outer wall, and a front wall connecting the outer and inner walls, the front wall having a convex profile with respect to the longitudinal axis; and a second annular mandrel having a longitudinal axis, an outer wall, an inner wall spaced radially inwardly from the outer wall, and a rear wall connecting the outer and inner walls, the rear wall having a concave profile with respect to the longitudinal axis; at least one of the outer walls of the first and second mandrels oriented at an angle of between 0° and 7° with respect to the longitudinal axis.

In a further form thereof, the present invention provides a concrete structure, including a curved wall having a circular opening with a longitudinal axis; and an annular gasket disposed within the opening, the gasket including a main body portion having an anchoring flange embedded within the wall and an annular pipe sealing portion with an annular clamping band seat, the opening including an exposed circular concrete surface oriented at an angle of between 0° and 7° with respect to the longitudinal axis and disposed adjacent the main body portion of the gasket.

In a still further form thereof, the present invention provides a method of forming and maintaining a concrete structure, including the steps of casting a first annular gasket within a wall of the structure using at least one mandrel, the gasket including a longitudinal axis and an anchor flange embedded within the wall, the mandrel having an annular outer surface aligned at an angle of between 0° and 7° with respect to the longitudinal axis of the gasket, whereby the mandrel forms an annular opening within the wall having an annular surface aligned at an angle of between 0° and 7° with respect to the longitudinal axis of the gasket; removing at least a portion of the first gasket from the wall to expose the annular surface of the opening; and installing a second gasket within the opening in the wall using an expansion band to sealingly compress at least a portion of the second gasket to the annular surface of the opening.

BRIEF DESCRIPTION OF THE DRAWINGS

The above-mentioned and other features and advantages of this invention, and the manner of attaining them, will become more apparent and the invention itself will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention any manner.

DETAILED DESCRIPTION

Figure 3:
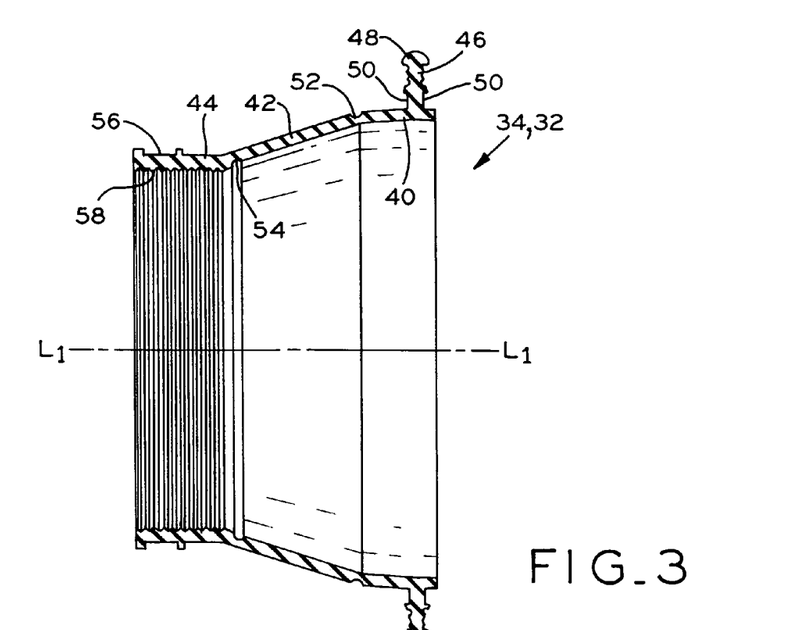
FIG. 3 is a sectional view of a gasket according to the present invention, the gasket shown in an unfolded position.
Figure 4:
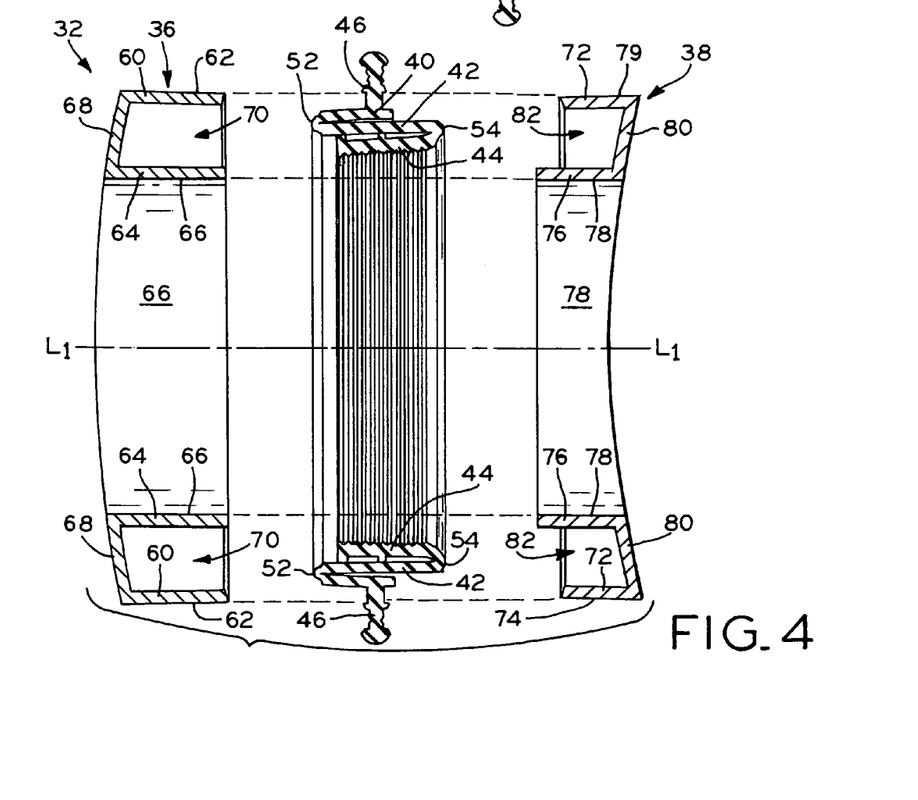
FIG. 4 is an exploded, horizontal sectional view showing the gasket of FIG. 3 in a folded position, together with a pair of mandrels for use in casting the gasket within a wall of a concrete structure in accordance with the present invention.

Referring to FIGS. 3 and 4, a gasket and mandrel assembly 32 in accordance with the present invention is shown, including a cast-in type gasket 34, shown in FIG. 3, which may be cast in place within the wall of a concrete structure using mandrels 36 and 38, shown in FIG. 4. Gasket 34 may be made from a suitable flexible elastomeric material, such as rubber or neoprene, for example, and generally includes an annular main body portion 40, an annular intermediate portion 42, and an annular pipe sealing portion 44.

Main body portion 40 of gasket 34 includes anchor flange 46 extending radially outwardly therefrom, with anchor flange 46 including an enlarged anchoring end 48 and a pair of undercuts 50 disposed on opposite sides of anchor flange 46 proximate main body portion 40 for the purpose described below. Intermediate portion 42 is connected to main body portion 40 by a first annular hinge section 52, which may be formed as a groove or weakening in gasket 34, and intermediate portion 42 is connected to pipe sealing portion 44 by a second annular hinge section 54, which also may be formed as a groove or weakening in gasket 34. Pipe sealing portion 44 includes at least one clamping band seat 56 for receipt of a clamping band as described below to sealingly connect pipe sealing portion 44 of gasket 34 to the outer surface of a pipe, and the inner surface of pipe sealing portion 44 includes a plurality of compressible sealing ridges 58 which are compressible against the outer surface of a pipe.

In FIG. 3, gasket 34 is shown in an unfolded or extended position in which intermediate portion 42 and pipe sealing portion 44 are extended outwardly of main body portion 40 along longitudinal axis $L_1$—$L_1$ of gasket 34, with intermediate portion 42 disposed at a sloped angle with respect to longitudinal axis $L_1$—$L_1$ of gasket 34 and pipe sealing portion 44 disposed generally radially inwardly of main body portion 40. In FIG. 4, gasket 34 is shown in a folded position in which intermediate portion 42 is folded about hinge section 52 radially inwardly of main body portion 40, and pipe sealing portion 44 is folded about second hinge section 54 radially inwardly of intermediate portion 42.

A pair of annular mandrels 36 and 38, including first or outer mandrel 36 and second or inner mandrel 38, are used to cast gasket 34 within the wall of a concrete structure in the manner described below. Mandrels 36 and 38 may be formed of metal or of a rigid plastic material, for example. Outer mandrel 36 generally includes a body including annular outer wall 60 with outer surface 62, and annular inner wall 64 disposed radially inwardly of outer wall 60 and including an inner surface 66 defining a central opening through mandrel 36. Front wall 68 connects outer wall 60 and inner wall 64, is annular in shape, and has a convex profile, as shown in FIG. 4. Outer mandrel 36 additionally includes an annular cavity 70 defined between outer wall 60, inner wall 64, and front wall 68 which opens toward the rear side of mandrel 36 opposite front wall 60.

Inner mandrel 38 generally includes a body including annular outer wall 72 with outer surface 74, and annular inner wall 76 disposed radially inwardly of outer wall 72 and including an inner surface 78 defining a central opening through mandrel 38. Rear wall 80 connects outer wall 72 and inner wall 76, is annular in shape, and has a concave profile, as shown in FIG. 4. Inner mandrel 38 additionally includes an annular cavity 82 defined between outer wall 72, inner wall 76, and rear wall 80 which opens toward the front side of mandrel 38 opposite rear wall 80.

As shown in FIG. 4, gasket 34 and mandrels 36 and 38 have a common longitudinal axis $L_1$—$L_1$ and, as described further below, outer surfaces 62 and 74 of mandrels 36 and 38 are aligned parallel to longitudinal axis $L_1$—$L_1$, or are aligned substantially parallel to longitudinal axis $L_1$—$L_1$ whereby outer surfaces 62 and 74 are angled slightly with respect to longitudinal axis $L_1$—$L_1$.

Figure 5:
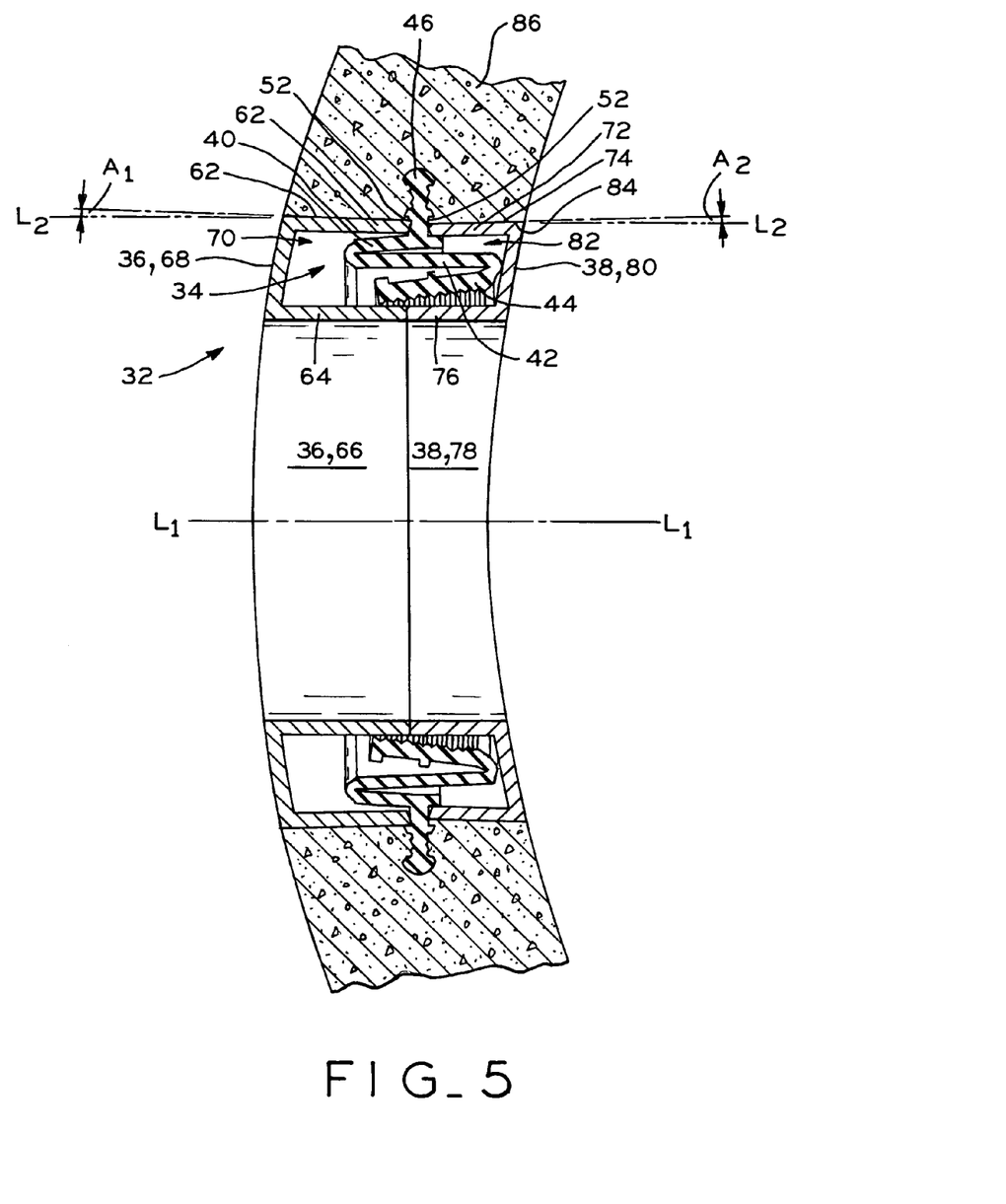
FIG. 5 is a horizontal sectional view through a concrete structure, showing the gasket and mandrels of FIG. 4.

When gasket 34 is in its folded position as shown in FIG. 4, main body portion 40, intermediate portion 42, and sealing portion 44 of gasket 34 may be enclosed within cavities 70 and 82 of mandrels 36 and 38, respectively, as shown in FIG. 5. Specifically, the folded gasket 34 is placed within cavities 70 and 82 of mandrels 36 and 38, and mandrels 36 and 38 are moved toward one another until inner walls 64 and 76 thereof contact one another as shown in FIG. 5. In this position, main body portion 40, intermediate portion 42, and pipe sealing portion 44 of gasket 34 are completely enclosed or encapsulated within cavities 70 and 82 of mandrels 36 and 38 to prevent liquid concrete from contacting the foregoing portions of gasket 34 during casting of gasket 34 within a concrete structure. Further, as shown in FIGS. 4 and 5, the inner edges of outer walls 60 and 72 of mandrels 36 and 38 are received within undercuts 52 in anchor flange 46 of gasket 34 to provide an interlock between mandrels 36 and 38 and anchor flange 46 which further prevents liquid concrete from contacting main body portion 40, intermediate portion 42, and pipe sealing portion 44 of gasket 34. With the foregoing interlocking arrangement between the inner edges of outer walls 60 and 72 of mandrels 36 and 38 and undercuts 52 in anchor flange 46, at least some of main body portion 40, intermediate portion 42, and pipe sealing portion 44 of gasket 34 need not be enclosed within cavities 70 of mandrels 36 and 38 to prevent same from being contacted by liquid concrete during casting. Anchor flange 46 of gasket 34 is exposed externally of mandrels 36 and 38 for embedment within the cast concrete.

As shown in FIG. 5, outer surfaces 62 and 74 of outer walls 60 and 72 of mandrels 36 and 38, respectively, are disposed parallel to the common longitudinal axis $L_1$—$L_1$ of gasket 34 and mandrels 36 and 38, or at a slight angle with respect to longitudinal axis $L_1$—$L_1$. Specifically, outer surfaces 62 and 74 of first and second mandrels 36 and 38 are disposed co-linear with a line $L_2$—$L_2$ parallel with longitudinal axis $L_1$—$L_1$, or alternatively, are disposed at angles $A_1$ and $A_2$, respectively, with respect to longitudinal axis $L_1$—$L_1$. Angles $A_1$ and $A_2$ may be small as 0.5°, more preferably 1.2°, most preferably 1.5°, from line $L_2$—$L_2$, or angles $A_1$ and $A_2$ may be as great as 7°, more preferably 4°, most preferably 2°, from line $L_2$—$L_2$. The inner surfaces 66 and 78 of inner walls 64 and 76 of mandrels 36 and 38, respectively, may or may not be aligned parallel with longitudinal axis $L_1$—$L_1$.

When gasket 34 is enclosed within mandrels 36 and 38 as shown in FIG. 5, the gasket and mandrel assembly 32 may be secured in a suitable manner between a pair of curved outer and inner form walls (not shown). The curved form walls fit against the convex front wall 68 of mandrel 36 and against the convex rear wall 80 of mandrel 38 in a concrete-tight manner. Thereafter, liquid concrete is poured between the form walls around gasket and mandrel assembly 32. As shown in FIG. 5, after the concrete cures, anchor flange 46 of gasket 34 is embedded within the cured concrete to anchor gasket 34 within the resulting opening 84 of the curved wall 86 of the concrete structure which is formed by the cured concrete.

Figure 6:
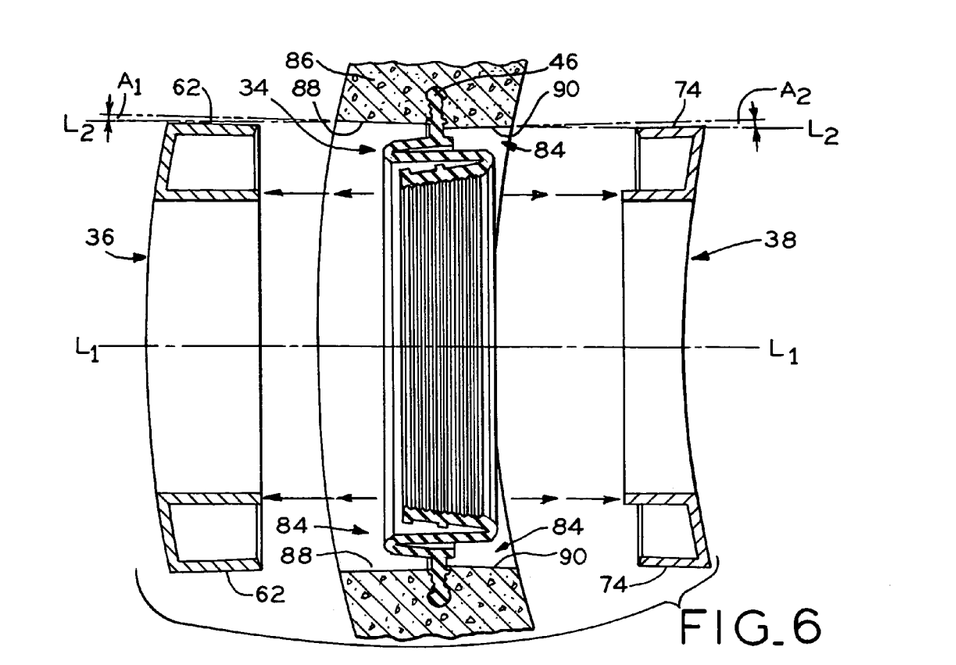
FIG. 6 is a horizontal sectional view through the concrete structure of FIG. 5, illustrating the removal of the mandrels after curing of the concrete.

Referring to FIG. 6, after the concrete cures and the form walls are removed, mandrels 36 and 38 may be removed from the opening 84 formed within wall 86 of the concrete structure by pulling mandrels outwardly from opening 84 in opposite directions along longitudinal axis $L_1$—$L_1$. Notably, a very slightly angled orientation between outer surfaces 62 and 74 of mandrels 36 and 38 with respect to longitudinal axis $L_1$—$L_1$ as discussed above facilitates the easy removal of mandrels 36 and 38 from opening 84 to reveal first and second circular inner surfaces 88 and 90 of opening 84 which are disposed on respective opposite sides of anchor flange 46 of gasket 34. First and second circular inner surfaces 88 and 90 of opening 84 are formed by outer surfaces 62 and 74 of mandrels 36 and 38, and are therefore disposed either parallel to longitudinal axis $L_1$—$L_1$, or at the same angles $A_1$ and $A_2$ with respect to longitudinal axis $L_1$—$L_1$ as are outer surfaces 62 and 74 of mandrels 36 and 38. If an outer surface 62 or 74 of mandrel 36 or 38 is disposed parallel with longitudinal axis $L_1$—$L_1$, it may be advantageous to form the annular body of the mandrel with a removable section or wedge which, when inserted into a gap in the annular body of the mandrel, forces the annular body of the mandrel into a circular shape for casting. After the concrete cures following casting, the removable section or wedge may be removed, allowing the annular body of the mandrel to slightly collapse radially inwardly in order to facilitate removal of the mandrel from the opening in the concrete wall.

Figure 7:
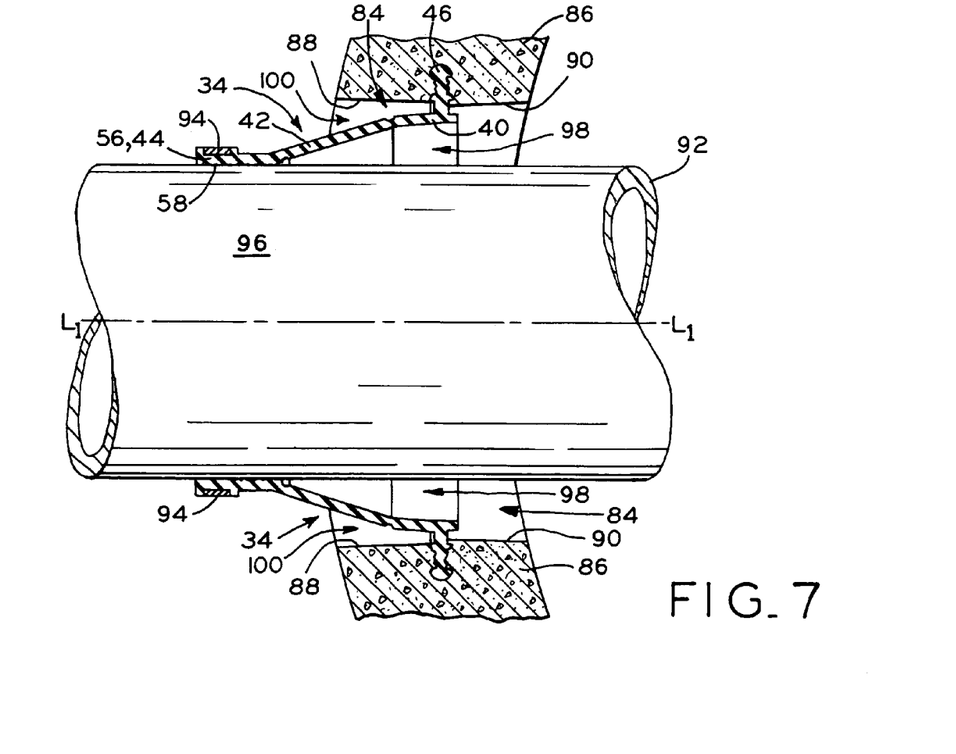
FIG. 7 is a horizontal sectional view through the concrete structure of FIG. 6, showing the gasket disposed in an unfolded position with the pipe sealing portion of the gasket sealingly connected to a pipe with a clamping band.

Referring to FIG. 7, after removal of mandrels 36 and 38, gasket 34 may be unfolded to its unfolded or extended position, and a pipe 92 may be inserted through gasket 34. Thereafter, a clamping band 94 is positioned within clamping band seat 56 of pipe sealing portion 44 of gasket 34, and is then radially tightened to sealingly compress sealing portion 44 and sealing ridges 58 of gasket 34 into fluid tight engagement with outer surface 96 of pipe 92, thereby providing a fluid tight seal between pipe 92 and wall 86 of the concrete structure.

Additionally, as shown in FIG. 7, a first annular space or gap 98 is formed between gasket 34 and pipe 92, and a second annular space or gap 100 is formed between gasket 34 and opening 84 in wall 86. These gaps 98 and 100 provide take-up spaces which accommodate flexing of gasket 34 to in turn accommodate angular tilting movement of pipe 92 from longitudinal axis $L_1$—$L_1$ if pipe 92 should shift position with respect wall 86 of the concrete structure after installation. If pipe 92 moves in a tilting manner from longitudinal axis $L_1$—$L_1$, clamping band 94 maintains fluid tight engagement between pipe sealing portion 44 of gasket 34 and pipe 92.

Figure 8:
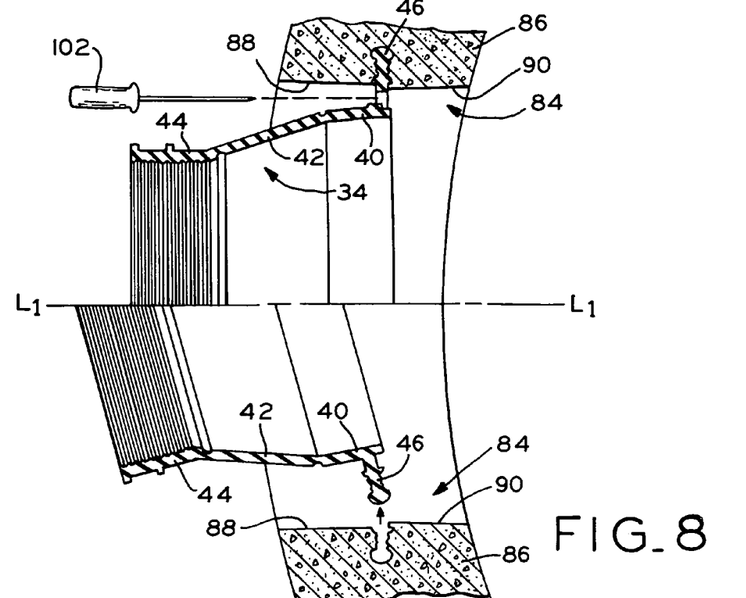
FIG. 8 is a horizontal sectional view of the gasket and the concrete structure of FIGS. 6 and 7, showing the removal of the gasket from the opening in the concrete structure by cutting the gasket in the upper portion of FIG. 8, or alternatively, by pulling the anchor flange of the gasket outwardly of the concrete structure, as shown in the lower portion of FIG. 8.
Figure 9:
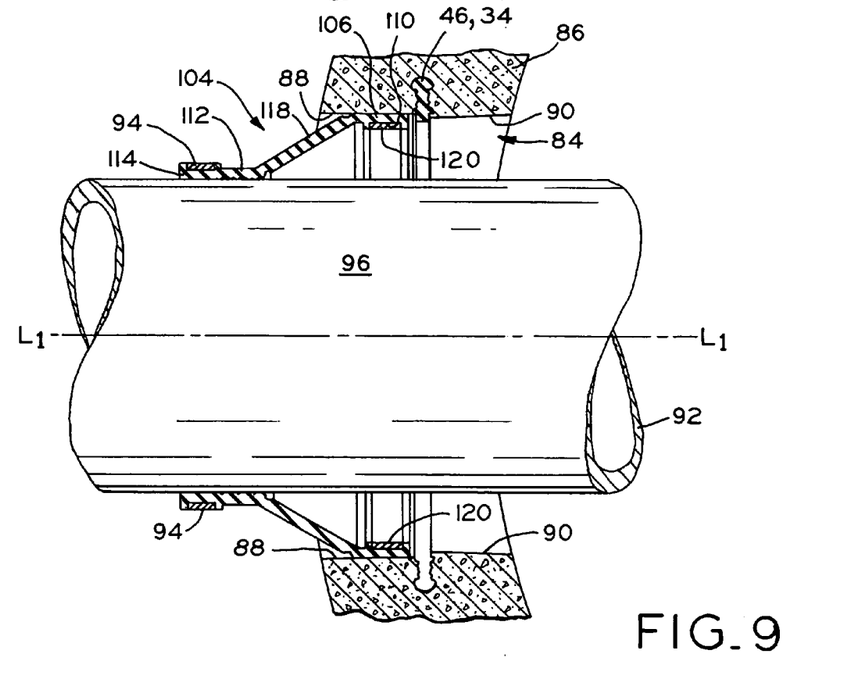
FIG. 9 is a horizontal sectional view through the concrete structure of FIG. 8 with the first gasket of FIGS. 3–8 removed therefrom, and showing a second, expansion-type gasket installed within the opening of the structure with an expansion band, the gasket sealingly connected to a pipe with a clamping band.

If gasket 34 needs to be replaced due to failure of gasket 34 or any other reason, gasket 34 may be removed and replaced with an expansion-type gasket in the manner shown in FIGS. 8 and 9. Referring to FIG. 8, after clamping band 94 and pipe 92 have been removed from gasket 34, gasket 34 may be removed from opening 84 in wall 86 of the concrete structure by at least one of the following two methods. First, as shown in the upper portion of FIG. 8, a utility knife 102 or other suitable tool may be used to cut gasket 34 at the base of anchor flange 46 to thereby separate main body portion 40 and the remainder of gasket 34 from anchoring flange 34. Thereafter, gasket 34 is removed from opening 84 with anchor flange 46 remaining embedded within wall 86 of the concrete structure. Alternatively, as shown in the lower portion of FIG. 8, when gasket 34 is formed of a material which is flexible enough to allow sufficient deformation of anchor flange 46, anchor flange 46 of gasket 34 may be pulled outwardly of wall 86 of the concrete structure.

After removal of gasket 34, a second, expansion-type gasket 104 may be installed within opening 84 of the concrete structure as follows. Gasket 104 is generally similar to gasket 34 described above and may be made of the same material, and includes an annular outer or wall sealing portion 106 having an outer surface and an inner surface including expansion band seat 110. Gasket 104 additionally includes an annular inner or pipe sealing portion 112 which includes an outer surface having a clamping band seat 114 and an inner surface. An intermediate portion 118 connects portions 106 and 112 of gasket 104.

An annular expansion band assembly, including expansion band 120 and an expanding device (not shown) are used to seal portion 106 of gasket 104 to one of circular inner surfaces 88 or 90 of opening 84 within wall 86. Specifically, as shown in FIG. 9, portion 106 of gasket 104 is fitted within opening 84 adjacent first surface 88 of opening 84. Thereafter, an expansion band 120 is fitted within expansion band seat 110, and an expanding device (not shown) is used to expand expansion band 120 outwardly to sealingly compress portion 106 of gasket 104 into sealing engagement with inner surface 88 of opening 84. Suitable expansion bands and expanding devices are described in U.S. Pat. Nos. 5,507,500, 5,732,955, and 5,954,354, as well as in U.S. Patent Application Publication No. 2004/0080118, each assigned to the assignee of the present application, the disclosures of which are expressly incorporated herein by reference. After gasket 104 has been installed within opening 84 in wall 86, a clamping band 94 may be used to sealingly compress portion 112 of gasket 104 into fluid tight sealing engagement with outer surface 96 of pipe 92, as shown in FIG. 9.

Advantageously, the angles $A_1$ and $A_2$ of circular surfaces 88 and 90 of opening 84, which are parallel to or only slightly angularly offset from longitudinal axis $L_1$—$L_1$ as described above, provide surfaces to which a portion of an expansion-type gasket may be sealingly compressed using an expansion band assembly as described above. By contrast, in the known arrangement shown in FIGS. 1 and 2, the inner surfaces of opening 16 in wall 14 are angled from longitudinal axis $L_1$—$L_1$ to a further extent, such that an expansion-type gasket cannot be compressed against such surfaces. Therefore, as described above, the present gasket and mandrel assembly 32 facilitates the formation of circular surfaces 88 and 90 of opening 84 at the angles discussed above, such that if the cast-in gasket 34 should fail or otherwise need to be replaced in the field, gasket 34 may be removed from wall 86 of the concrete structure followed by installation of an expansion-type gasket 104 without necessitating repairs or re-casting of a portion or the entirety of the concrete structure.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A gasket and mandrel assembly, comprising:
 a gasket, comprising:
   an annular main body portion having a longitudinal axis;
   an anchor flange extending radially outwardly from said main body portion;
   a pipe sealing portion extending from said main body portion, said pipe sealing portion positioned in a folded condition in which said pipe sealing portion is disposed at least partially within said main body portion; and
 a pair of mandrels respectively fitted to opposite sides of said gasket, at least one of said mandrels having an annular outer surface disposed at an angle of between 0.5° and 7° with respect to said longitudinal axis of said gasket, said mandrels cooperating with one another to substantially enclose at least a portion of said gasket with said anchor flange exposed externally of said mandrels.

2. A gasket and mandrel assembly, comprising:
 a gasket, comprising:
   an annular main body portion having a longitudinal axis;
   an anchor flange extending radially outwardly from said main body portion;
   a pipe sealing portion extending from said main body portion said pipe sealing portion positioned in a folded condition in which said pipe sealing portion is disposed at least partially within said main body portion; and
 a pair of mandrels respectively fitted to opposite sides of said gasket at least one of said mandrels having an annular outer surface disposed at an angle of between 1.5° and 4° with respect to said longitudinal axis of said gasket, said mandrels cooperating with one another to substantially enclose at least a portion of said gasket with said anchor flange exposed externally of said mandrels.

3. The gasket and mandrel assembly of claim 1, wherein said pipe sealing portion of said gasket is foldable between a first position in which said pipe sealing portion is disposed substantially within said main body portion of said gasket and a second position in which said pipe sealing portion extends away from said main body portion along said longitudinal axis.

4. The gasket and mandrel assembly of claim 1, said gasket further comprising an intermediate portion connecting said main body portion and said pipe sealing portion.

5. The gasket and mandrel assembly of claim 4, said gasket further comprising hinge portions respectively connecting said main body portion with said intermediate portion and said intermediate portion with said pipe sealing portion.

6. A gasket and mandrel assembly, comprising:
a gasket, comprising:
an annular main body portion having a longitudinal axis;
an anchor flange extending radially outwardly from said main body portion;
a pipe sealing portion extending from said main body portion, said pipe sealing portion positioned in a folded condition in which said pipe sealing portion is disposed at least partially within said main body portion; and
a pair of mandrels respectively fitted to opposite sides of said gasket at least one of said mandrels having an annular outer surface disposed at an angle of between 0° and 7° with respect to said longitudinal axis of said gasket, said mandrels cooperating with one another to substantially enclose at least a portion of said gasket with said anchor flange exposed externally of said mandrels, wherein said anchor flange comprises at least one undercut, at least a portion of one of said mandrels received within said undercut.

7. The gasket and mandrel assembly of claim 1, wherein one of said pair of mandrels includes an annular front wall disposed generally transverse to said longitudinal axis, said front wall having a convex profile, and the other of said pair of mandrels includes an annular rear wall disposed generally transverse to said longitudinal axis, said rear wall having a concave profile.

8. A mandrel assembly for use in casting a gasket within a curved wall of a structure, comprising:
a first annular mandrel having a longitudinal axis, an outer wall, an inner wall spaced radially inwardly from said outer wall, and a front wall connecting said outer and inner walls, said front wall having a convex profile with respect to said longitudinal axis; and
a second annular mandrel having a longitudinal axis, an outer wall, an inner wall spaced radially inwardly from said outer wall, and a rear wall connecting said outer and inner walls, said rear wall having a concave profile with respect to said longitudinal axis;
at least one of the outer walls of said first and second mandrels oriented at an angle of between 0° and 7° with respect to said longitudinal axis.

9. The mandrel assembly of claim 8, wherein said at least one outer wall is oriented at an angle of between 0.5° and 4° from said longitudinal axis.

10. The mandrel assembly of claim 8, wherein said at least one outer wall is oriented at an angle of between 1.5° and 2° from said longitudinal axis.

11. The mandrel assembly of claim 8, wherein said outer, inner, and front walls of said first mandrel define a first cavity and said outer, inner, and front walls of said second mandrel define a second cavity, said first and second cavities facing one another when said first and second mandrels are disposed along a common longitudinal axis.

12. The mandrel assembly of claim 8, wherein at least one of said first and second mandrels is made of a rigid plastic material.

13. The gasket and mandrel assembly of claim 1, wherein said outer surface of said mandrel is disposed at an angle of between 1.5° and 2° with respect to said longitudinal axis of said gasket.

14. The gasket and mandrel assembly of claim 6, wherein said outer surface of said mandrel is disposed at an angle of between 0.5° and 4° with respect to said longitudinal axis of said gasket.

15. The gasket and mandrel assembly of claim 6, wherein said outer surface of said mandrel is disposed at an angle of between 1.5° and 2° with respect to said longitudinal axis of said gasket.

16. A gasket and mandrel assembly, comprising:
a gasket, comprising:
an annular main body portion having a longitudinal axis;
an anchor flange extending radially outwardly from said main body portion;
a pipe sealing portion extending from said main body portion, said pipe sealing portion positionable in a folded condition in which said pipe sealing portion is disposed at least partially within said main body portion; and
a mandrel assembly, comprising:
a first mandrel having a body with an annular outer surface disposed at an angle of between 0.5° and 7° with respect to said longitudinal axis of said gasket; and
a second mandrel having an annular body, said first and second mandrels cooperating with one another to substantially enclose at least a portion of said gasket with said anchor flange exposed externally of said mandrels.

17. The gasket and mandrel assembly of claim 16, wherein said outer surface of said first mandrel is disposed at an angle of between 0.5° and 4° with respect to said longitudinal axis of said gasket.

18. The gasket and mandrel assembly of claim 16, wherein said outer surface of said first mandrel is disposed at an angle of between 1.5° and 4° with respect to said longitudinal axis of said gasket.

19. The gasket and mandrel assembly of claim 16, wherein said pipe sealing portion of said gasket is foldable between a first position in which said pipe sealing portion is disposed substantially within said main body portion of said gasket and a second position in which said pipe sealing portion extends away from said main body portion along said longitudinal axis.

20. The gasket and mandrel assembly of claim 16, wherein said anchor flange comprises at least one undercut, at least a portion of one of said mandrels received within said undercut.

* * * * *

UNITED STATES PATENT AND TRADEMARK OFFICE
CERTIFICATE OF CORRECTION

PATENT NO.         : 7,028,972 B2
APPLICATION NO. : 10/887427
DATED              : April 18, 2006
INVENTOR(S)        : Michael R. Miller et al.

It is certified that error appears in the above-identified patent and that said Letters Patent is hereby corrected as shown below:

Claim 2, Column 8, Line 41, after "portion" insert --,-- (First Occurance)

Claim 6, Column 9, line 13, after "gasket" insert --,--

Signed and Sealed this

Twenty-third Day of January, 2007

JON W. DUDAS
*Director of the United States Patent and Trademark Office*